US006859839B1

(12) United States Patent
Zahorjan et al.

(10) Patent No.: US 6,859,839 B1
(45) Date of Patent: Feb. 22, 2005

(54) BANDWIDTH REDUCTION OF ON-DEMAND STREAMING DATA USING FLEXIBLE MERGER HIERARCHIES

(75) Inventors: John Zahorjan, Seattle, WA (US); Derek L. Eager, Saskatoon (CA); Mary K. Vernon, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 701 days.

(21) Appl. No.: 09/633,217

(22) Filed: Aug. 7, 2000

Related U.S. Application Data

(60) Provisional application No. 60/147,569, filed on Aug. 6, 1999.

(51) Int. Cl.[7] .......................... G06F 15/16; H04N 7/173

(52) U.S. Cl. .......................... 709/231; 725/97; 725/87; 725/90

(58) Field of Search ................................ 709/230, 231, 709/232, 233; 725/87, 91, 93, 95, 96, 97, 101

(56) References Cited

U.S. PATENT DOCUMENTS

| | | | | |
|---|---|---|---|---|
| 5,357,276 A | * | 10/1994 | Banker et al. ............... | 725/102 |
| 5,453,779 A | * | 9/1995 | Dan et al. ..................... | 725/88 |
| 5,461,415 A | * | 10/1995 | Wolf et al. .................... | 725/88 |
| 5,477,263 A | * | 12/1995 | O'Callaghan et al. ....... | 725/102 |
| 5,512,934 A | * | 4/1996 | Kochanski .................... | 725/97 |
| 5,915,094 A | * | 6/1999 | Kouloheris et al. .......... | 709/219 |
| 6,311,161 B1 | * | 10/2001 | Anderson et al. ............ | 704/500 |
| 6,543,053 B1 | * | 4/2003 | Li et al. ........................ | 725/88 |
| 6,598,228 B2 | * | 7/2003 | Hejna, Jr. ..................... | 725/91 |

OTHER PUBLICATIONS

Zhao et al, "Bandwidth–Efficient Continuous Media Streaming Through Optimal Multiplexing", In ACM Sigmetrics (Atlanta, GA, Jun. 1999), pp. 13–22.*

P. Basy et al, "An Implementation of Dynamic Service Aggregation for Interactive Video Delivery", Proc. SPIE Multimedia Computing and Networking '98, San Jose, CA, USA, pp. 110–122, Jan. 1998.*

P. Basu et al, "Optimal Stream Clustering Problems in Video–on–Demand", Proc. Parallel and Distributed Computing and Systems '98—Special Session on Distributed Multimedia Computing, Las Vegas, NV, USA, pp . 220–225, Oct. 1998.*

M.Y.Y. Leung et al, "Buffer and I/O Resource Pre–allocation for Implementing Batching and Buffering Techniques for Video–on–Demand Systems", In Proc. of the 13th Intl. Conf. on Data Engineering, Birmingham, U.K., Apr. 1997.*

Krishnan, et al, "Service aggregation through rate adaptation using a single storage format", Network and Operating System Support for Digital Audio and Video, 1997, Proceedings of the IEEE 7th International Workshop on, May 19–21, 1997, pp: 197–206.*

(List continued on next page.)

*Primary Examiner*—William A. Cuchlinski, Jr.
*Assistant Examiner*—Yemane M. Gerezgiher
(74) *Attorney, Agent, or Firm*—Quarles & Brady LLP

(57) ABSTRACT

A method of efficiently transmitting streamed data of a program to multiple clients requesting the program at different times ranks the requests in a multilevel hierarchy, which describes merging of data streams servicing the requests. The multilevel hierarchy changes dynamically as new requests arrive or existing data streams are merged to reduce the bandwidth or other costs required to serve the requests. The hierarchy may be established by simple rules or by a modeling of the actual cost of possible hierarchies.

27 Claims, 4 Drawing Sheets

OTHER PUBLICATIONS

Xiaoye et al, "Stream scheduling algorithms for multimedia storage servers", Parallel Proceedings. 1998 International Conference on Aug. 10–14, 1998, pp.: 321–328.*

Poon et al, "New batching policy for providing true video–on–demand (T–VoD) in multicast system", Communications, 1999. ICC '99. 1999 IEEE International Conference on, vol. : 2, Jun. 21–23, 1999, pp.: 132–139.*

Poon et al, "Design and analysis of multicast delivery to provide VCR functionality in video–on–demand systems", ATM, 1999. ICATM '99. 1999 2nd International Conference on, Jun. 21–23, 1999, pp.: 132–139.*

*Skyscraper Broadcasting: A New Broadcasting Scheme For Metropolitan Video–on–Demand Systems*, Kien A. Hua et al., SIGCOMM '97 Cannes, France.

*A Low Bandwidth Broadcasting Protocol for Video on Demand*, Jehan–Francois Paris et al., Int'l Conference on Computer Communication and Networks (ICCCN), Oct. 1998.

*Efficient Broadcasting Protocols for Video Demand*, Jehan–Francois Paris et al., Proc. Mascots '98, Montreal, Jul. 1998.

*Efficient Schemes for Broadcasting Popular Videos*, Lixin Gao, et al.

Metropolitan area video–on–demand service using pyramid broadcasting, S. Viswanathan et al., Multimedia Systems (1996) 4:197–208.

*A Permutation–Based Pyramid Broadcasting Scheme for Video–on–Demand Systems*, Charu C. Aggarwal et al.

*Design and Analysis of Permutation–Based Pyramid Broadcasting*, Charu C. Aggarwal et al., U of S Computer Science, RC 20620, Nov. 8, 1996.

*Tailored transmissions for efficient Near–Video–On–Demand service\**, Yitzhak Birk et al.

*Reducing I/O Demand in Video–On–Demand Storage Servers*, Leana Golubchik et al., Sigmetrics '95 Ottawa, Ontario, Canada.

*On Optimal Piggyback Merging Policies for Video–On–Demand Systems*, Charu Aggarwal et al., Sigmetrics '96, 5/96 PA.

*Adaptive Piggybacking Schemes for Video–on–Demand Systems*, Charu C. Aggarwal et al., RC 20635 (Nov. 19, 1996) IBM Research Division.

Merging video streams in a multimedia storage server: complexity and heuristics, Siu–Wah Lau et al., Multimedia Systems (1998) 6:29–42.

*Patching: A Multicast Technique for True Video–on–Demand Services*, Kien A. Hua et al., ACM Multimedia 98—Electronic Proceedings.

*Improving Video–on–Demand Server Efficiency Through Stream Tapping*, Steven W. Carter, et al., Proc. Int'l Conf. On Computer Communication and Networks (ICCCN), Las Vegas, Sep. 1997, pp. 200–207.

*Stream Tapping: a System for Improving Efficiency on a Video–on–Demand Server*, Steven w. Carter et al., UCSC–CRL–97–11, Nov. 2, 1997.

*Supplying Instantaneous Video–on–Demand Services Using Controlled Multicast*, Lixin Gao et al.

*Optimal Patching Schemes for Efficient Multimedia Streaming\**, Subhabrata Sen et al.

*Dynamic batching policies for an on–demand video server*, Asit Dan et al., Multimedia Systems (1996) 4:112–121.

*On Optimal Batching Policies for Video–on–Demand Storage Servers*, Charu C. Aggarwal et al., IEEE Multimedia Computing & Systems Conf., Hiroshima, Japan, Jun. 1996.

*Group–Guaranteed Channel Capacity in Multimedia Storage Servers*, Athanassios K. Tsiolis et al., Sigmetrics 1997 Conference.

\* cited by examiner

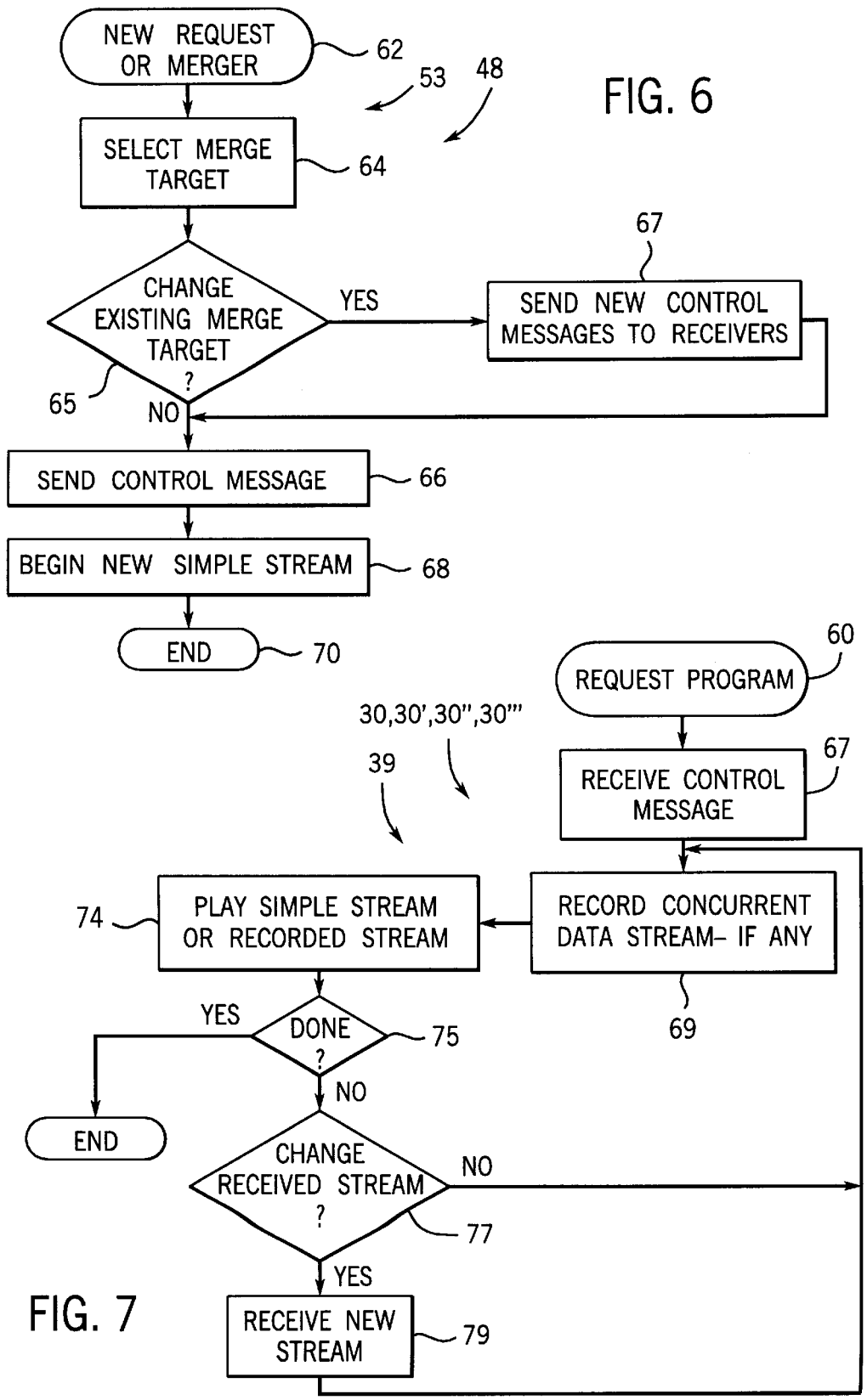

BANDWIDTH REDUCTION OF ON-DEMAND STREAMING DATA USING FLEXIBLE MERGER HIERARCHIES

CROSS-REFERENCE TO RELATED APPLICATIONS

This application is based on provisional application 60/147,569 filed Aug. 6, 1999 and claims the benefit thereof.

STATEMENT REGARDING FEDERALLY SPONSORED RESEARCH OR DEVELOPMENT

This invention was made with United State government support awarded by the following agencies:

NSF 9975044

The United States has certain rights in this invention.

BACKGROUND OF THE INVENTION

The present invention relates to methods of transmitting "streaming data", such as video or audio content, to multiple clients at arbitrary delivery times within a delivery period and as selected by the clients. In particular, the present invention provides a method of reducing the bandwidth or other costs associated with transmitting such data at different delivery times to different clients.

"Streaming data" is data that a client will process sequentially as it is received during a transmission, under a timeliness constraint requiring progress in the reception of the data. Examples of streaming data are video and audio programs, including movies, television shows, news clips, product advertisements, medical or recreational information, or education programs. This list of examples is not exhaustive. "On-demand delivery" of streaming data is the delivery of streaming data triggered by client requests for that data, rather than simply by reaching a previously defined point in time. For example, in a video on-demand (VOD) system a customer might be able to request a video program at any time, with the expectation that the video would be viewable within a small time following the request.

Programs of streaming data may be stored at and transmitted from a server to clients via phone lines, cable, broadcast radio, satellite links or other media. The server may be a single machine or a set of machines that together provide a service.

On-demand delivery may be provided by making a separate transmission of data to each client when the client request arrives. This approach is simple and works with standard receiving devices but has the disadvantage of requiring a large number of transmission channels, one for each new client. The transmission capacity of the server and the intervening communications medium (phone lines, cable etc.) is termed "bandwidth," referring generally to the amount of data transmitted in a given time interval. For this simple scheme of providing on-demand delivery of streaming data, the bandwidth required to serve the clients increases linearly with the number of clients and thus does not scale well to large numbers of clients. The bandwidth can be reduced by "batching" clients, that is, by delaying the transmission of the program to a first client request for some interval in the hope that additional client requests for the same item will be received, and then serving all clients in a batch with a single stream. However, the bandwidth savings achieved by batching is, under standard assumptions about client request times, inversely proportional to the delay imposed in the start of the data transmission for at least some clients.

Piggybacking

Referring to FIG. 2, the transmission of each data stream describes a line on a graph plotting sequential position in the data stream (for example a frame number in a video transmission) against time. Sequential position as shown varies between zero and one where one indicates completion of the data stream.

A primary data stream 10 requested at delivery time $t_1$ is delivered at some base rate (indicated by the slope of the line extending from time $t_1$) that allows the client to view the data without interruption once playback begins.

At a later time $t_2$ the server may receive a second request for the same program. Instead of transmitting an entirely new data stream, the technique of piggybacking responds to this second request by transmitting an accelerated data stream 12. This accelerated data stream is actually a different encoding of the program, such that the slightly fewer frames are created for each minute of the program. Data stream 12 delivers the same number of frames per minute as stream 10 but because these frames cover more than one minute of the program, the client receiving stream 12 progresses through the program at a rate that is imperceptibly faster (e.g., 5% faster) than the client who receives simple data stream 10. As a result of these differences in viewing rate, the data streams 10 and 12 will intersect at time $t_3$ and the accelerated data stream 12 may terminate, saving the bandwidth that would have been required for its continuation. After data streams 10 and 12 have merged, the continuation of stream 10 can be merged with an earlier or later stream for the same program, by accelerating stream 10 or by accelerating the later stream, respectively.

Like the previous method of on-demand delivery, piggybacking requires no storage of data at the client's receiver, yet it reduces the bandwidth required for multiple clients. On the other hand, multiple encodings of the file must be stored at the server or created when the file is transmitted to different clients. Furthermore, either the rate at which an accelerated stream merges with a simple data stream is limited by the rate at which a client can view the accelerated stream without noticing that it has been accelerated, or the distortion in the accelerated stream may be unacceptable.

Skyscraper Broadcasts

Referring to FIG. 3, a second way of limiting the bandwidth required for supporting on-demand transmission of streaming data divides the program into a plurality of "channels" 20a through 20d with each successive channel repeatedly transmitting a different time segment 21a–21d of the program. Thus, for example, channel 20a represented by a row of the chart of FIG. 3 may repeatedly transmit the first one-minute of the program, thus, from zero to one minute. Channel 20b in contrast may repeatedly transmit from minutes 2 and 3 of the program while channel 20c may transmit minutes 4 and 5 of the program, each of channels 20b and 20c repeating their segment on a two-minute basis. Channel 20d may transmit minutes 6–9.

Under this system, a client wishing to receive the program at time $t_1$ waits until the next delivery time on an even minute increment (i.e., $t_2$) and then listen to channel 20a to receive the first minute of the program indicated by stream 22. The client's receiver begins displaying that first minute and simultaneously records channel 20b providing segment 21b of minutes 1–3 of the program. At the conclusion of the stream 22 at time $t_3$, the client's receiver begins playing the previously recorded portions of stream 24 of segment 21b at its beginning while continuing to record segment 21b on channel 20b. At time $t_4$, one minute later, the client's receiver begins recording channel 20d in preparation for the termination of the segment on channel 20c two minutes later. In this way, by simultaneously recording and playing different channels, a continuous program may be assembled starting at any even minute interval. This method is termed "skyscraper broadcasts" referring generally to the way the complete program is assembled from segments of different sizes which when stacked like blocks from smallest to largest resemble the profile of a sky scraper.

It can be seen from this simple example that with skyscraper broadcasts, four channels may provide a nine-minute program starting every minute. If separate data streams were used for each new start time, nine channels would be required so it is apparent that skyscrapering can significantly reduce the bandwidth required for regular transmissions. It should be appreciated that the bandwidth savings is even greater for longer running programs; for example, a two-hour movie can start every minute using just 12 skyscraper channels (with the number of minutes delivered on each channel having the pattern 1,2,2,4,4,8,8, . . . ), rather than the 120 channels that would be required if a separate data stream were used for each new start time. Further the reconstructed programs are not time distorted as required by piggybacking. On the other hand, the client receiver must have the ability to concurrently store and playback received data and must be capable of following more sophisticated storage and playback schemes than are required for piggybacking. Further because periodicity of the initial time segments (for channel 20a) is fixed and predetermined, skyscraper broadcasting is not truly an on-demand system as the client must wait for the initial segment starting time.

Patching

Patching, like the skyscraper technique, assumes that the client receiver may simultaneously store and playback portions of the program and may follow a given storage and playback scheme. Because the technique of patching has some similarities to the technique of piggybacking, it will be explained by referring again to FIG. 2.

Again assume a primary data stream 10 is requested by a first client at delivery time $t_1$ and delivered at a rate equal to the rate at which the client reviews the primary data stream 10. A request for the same program by a second client at time $t_2$ causes the allocation of a second data stream 14 having the same data rate as primary data stream 10 but starting at time $t_2$ from the beginning of the program.

At time $t_2$ the second client receiver also begins recording the ongoing transmission of the primary data stream 10 from stream position $p_1$. The receiver is thus receiving data at a higher rate of a composite data stream 15 equal to the sum of the rates of the data streams 10 and 14. This composite stream merges with the primary data stream 10 at time $t_3$ at which time data stream 14 (being part of composite data stream 15) may be terminated saving the bandwidth that would have been required if data stream 14 had continued for the length of the program without an attendant time distortion.

At a fourth time $t_4$, a third client may request the media stream and composite data stream 13 may be created from the ongoing primary data stream 10 and a new data stream 16. This composite data stream 13 then merges with primary data stream 10 and data stream 16 is terminated. Additional client requests may be accommodated in this manner until the time when a composite data stream will no longer be able to merge with the primary data stream 10 before its conclusion, at which time a new primary data stream 10 is started. Additionally, variants of patching may start a new primary data stream for a client that could merge with an existing primary data stream, as a performance optimization.

BRIEF SUMMARY OF THE INVENTION

The present invention provides true on-demand delivery with scalability better than that of previously existing true on-demand approaches. Further, it may be combined with techniques that do not provide true on-demand service to further reduce the bandwidth requirements of those techniques.

The present inventors have recognized that the efficiency of skyscraper broadcasts flows in part from its merging of data streams into a multi-level hierarchy. At each level of the hierarchy where earlier streams are merged into larger groups, an attendant savings in bandwidth is realized. The present invention, therefore, as a first matter, provides a multi-level hierarchy of merging to produce a high degree of scalability with no program distortion and true on-demand delivery.

The present inventors have also recognized that a fixed merger hierarchy, with each later stream merging in a predetermined pattern into earlier streams, may not be effective for on-demand delivery. As an alternative, the present invention provides a dynamic merger hierarchy which is broadly a function of the actual delivery times requested by clients and that will produce greater bandwidth savings. Non-intuitively, such merger hierarchies may result in a longer time before merging for a given client, and may allow clients to discard previously received data in some circumstances without creating a need for additional transmissions from the server.

Specifically, the present invention provides a method of transmitting a streaming data file on-demand including the steps of scheduling a transmission of a program in response to a client request by a client; selecting a target transmission that is farther along in the program as a merge target for the transmission, so that the transmission could merge with the target transmission absent a change in the target transmission; receiving at the client a composite of the first transmission and data of the merge target, neither of which is time-distorted; and merging the transmission and the merge target and subsequent to the merger, merging the merge target with another transmission.

Thus it is one object of the invention to provide the benefits of a multilevel hierarchy in the context of a true on-demand delivery system. By merging streams with each other prior to merger with an earlier contemporaneous stream greater consolidation of bandwidth may be achieved.

The merge target may be chosen to reduce transmission costs that are a function of total bandwidth of the transmission of the streaming data to clients.

Thus it is another object of the invention to provide a merging structure that flexibly changes to reflect transmission costs.

In one embodiment, the determination of transmission costs may be done at the time of receipt of the request of the client.

Thus it is another object of the invention to provide a dynamic merging structure that changes in response to unpredictable arrival times of client requests.

Determining transmission costs may be by modeling or by the use of predetermined merger rules related to relative arrival times of the client requests.

Thus it is another object of the invention to provide a dynamic hierarchy of merging that may be employed efficiently on simple servers through easily implemented rules or on more complex servers which have the capacity for actual modeling of costs.

In one embodiment, merge targets may be selected by static techniques.

Thus it is an object of the invention to provide at least one extremely simple rule for dynamic merging.

The foregoing and other objects and advantages of the invention will appear from the following description. In the description, reference is made to the accompanying drawings, which form a part hereof, and in which there is shown by way of illustration a preferred embodiment of the invention. Such embodiment does not necessary represent the full scope of the invention, however, and reference must be made to the claims herein for interpreting the scope of the invention.

BRIEF DESCRIPTION OF THE DRAWINGS

FIG. 6 is a flow chart of a program as may be executed on the server of FIG. 1 to produce data streams in response to client requests;

FIG. 7 is a flow chart of a program as may be executed on the clients of FIG. 1 to process the data streams as produced by the server of FIG. 1;

DETAILED DESCRIPTION OF THE INVENTION

The example of video on-demand will be described, it being understood that the invention applies also to other types of streaming data.

Figure 1:
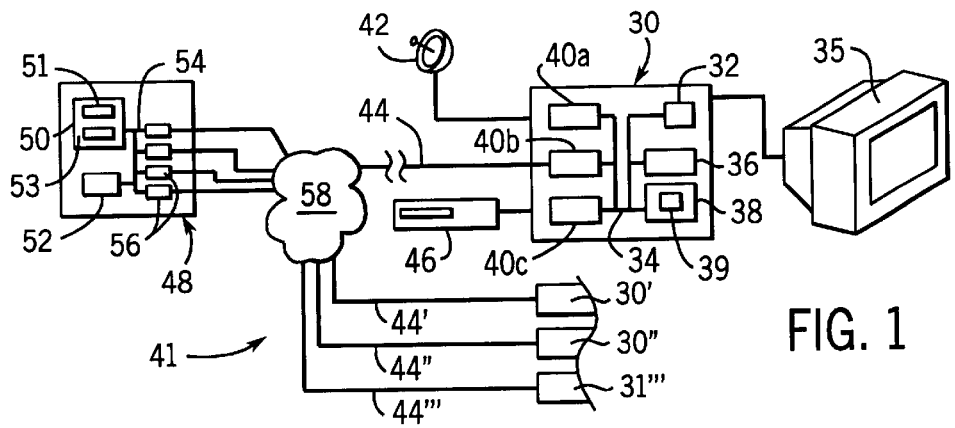
FIG. 1 is a block diagram of a transmission and receiving system suitable for practice of the present invention showing connection of a server through a variety of links to multiple clients.
Figure 2:
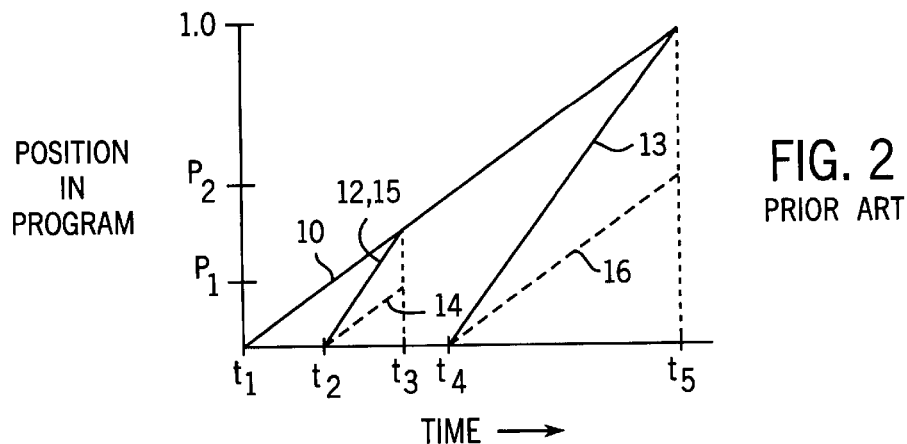
FIG. 2 is a graph plotting program position vs. time for transmissions under the prior art patching and piggybacking techniques as described above.
Figure 3:
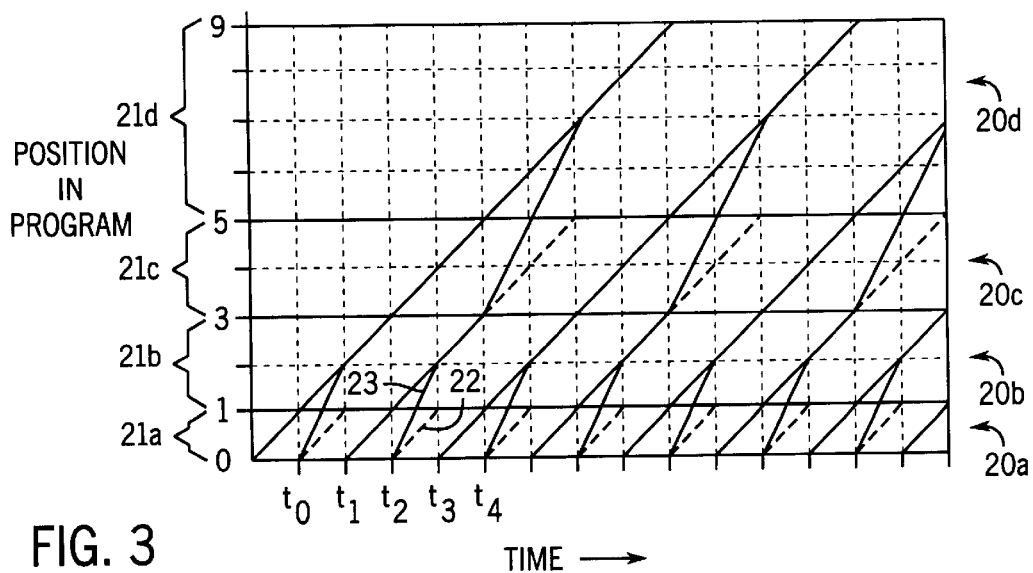
FIG. 3 is a graph similar to that of FIG. 2 showing the prior art technique of skyscrapering described above such as illustrates its multi-level hierarchical nature as recognized by the present inventors.

Referring now to FIG. 1, a client receiver 30 connects via an output port 32 with a television monitor 35 on which a client may view streamed video data. Output port 32 receives data via an internal bus 34 from a processor 36 that may execute a stored receiver program 39 (as will be described below) contained in memory 38 also connected to the internal bus 34. The internal bus also connects to one or more input/output ("I/O") ports 40a through 40c, which provide for the receipt of streaming data. I/O ports 40a through 40c may be connected, for example, singly or multiply to any of a variety of transmission media 41 including a satellite antenna 42a, ground lines 44 such as a telephone line or cable, or to a fixed media player 46, any of which may provide for one or more data streams.

A server 48 holds a video program 51 in memory 50 which will be formatted into data streams according to the present invention by a processor 52 executing a stored server program 53 (described below) also stored in memory 50. The processor 52 and memory 50 communicate with each other over an internal bus 54 and also with multiple I/O ports 56 which may communicate via the previously described transmission media 41 and devices to multiple receivers 30, 30' and 30".

The particular communication protocols between the server 48 and the receivers 30 are not critical provided they allow for broadcasting or multicasting in multiple logical channels and in a broadcast or multicast manner to other receivers 30', 30" and 30'" shown connected via lines 44', 44" or 44'".

Overview of Dynamic Hierarchies

To achieve effective bandwidth reduction, clients are merged in a hierarchical manner. A major question for any such technique is how to pair clients for merging. The present invention includes, but is not limited to, a family of techniques that rely on the notion of a "race" to determine these pairings. A spectrum of techniques exist within this family. In each technique, each client (except the oldest) may have a current merge target, and operates in a way that would allow it to merge with that target at some future time, if the media program is long enough and depending on the outcomes of other mergings that are in progress by other existing clients and those clients that might arrive in the future. The succession of merges that occur, are those merges that happen earliest, given the ongoing set of races taking place. Each merge that occurs, and each new client request received, may result in one or more clients choosing new merge targets, and so may change the set of races.

The family of techniques varies in how much effort is put in to evaluating what the set of winning races will be, given the information available at the time of a new client arrival. In this sense, the simplest technique in this family is to choose for each client stream, upon its creation due to a new client arrival or the merger of two existing streams, a merge target selected at random from the set of existing streams at that time. This is not a particularly effective technique, though. A better choice is for each client to pick as its target that other stream ahead of it that is least far along in the program at the time. Like random selection, this technique requires no prediction of the outcomes of current races. More complicated techniques do perform some race outcome prediction, either exactly (under some set of assumptions about future client request times) or approximately, and use this information to avoid assigning targets that are predicted to be unreachable at a given time because of the outcomes of the races in progress.

First Client Request

Referring now to FIGS. 1 and 7, at time zero, the processor 36, in response to client input from a keyboard or the like (not shown), may execute the stored receiver program 39 to request a video program as indicated by process block 60. This first request may be transmitted via one of the I/O ports 40 on the various transmission media 41 to the server 48.

Figure 8A:
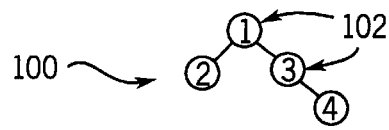
FIGS. 8a and 8b are examples of the hierarchy of requests formed in producing the data streams of FIG. 4.

Referring now to FIGS. 1, 6 and 8a, in response to the first request, received as indicated by process block 62, the server 48 executing server program 53 identifies a merge target at process block 64 so as to place the request in a hierarchy 100. Process block 62 is entered also after mergers of streams which may necessitate a review of existing hierarchies 100. The requests will generally arrive in an aperiodic and asynchronous fashion.

The hierarchy 100 (shown in FIG. 8a) provides a tree structure with the requests as nodes 102 (circled numbers) joined by branches into an arbitrary number of levels measured by the number of branches separating a node from a root node of the tree. Generally the hierarchy 100 indicates which requests will eventually share data streams, if no further changes are made to the hierarchy. With no further changes, the streams being transmitted for requests at lower levels in the hierarchy will merge with those for requests at higher levels to which they are connected by branches.

Initially no earlier request for this particular video program 51 are being processed so the first request (indicated by circled number 1) is placed at the top level of the hierarchy 100, indicating that its data stream (as will be generated) merges with no other earlier data streams. The hierarchy of other requests has not changed (because there are no other requests) so the merge target remains the same as checked at decision block 65. Therefore, the server program 53 proceeds to process block 66 where the server 48 responds to the receiver 30 with a control message specifying the identity (for instance, the Internet multicast address) of the data stream that the receiver should listen to. The server 48 then begins a new data stream 80 (shown in FIG. 4), as indicated at process block 68, before concluding its execution at process block 70.

Referring again to FIG. 7, the control message is received at receiver 30 as indicated by process block 67 and because the request by the receiver 30 is at the root of the hierarchy 100, the receiver need only listen to a single data stream 80 transmitted from the server 48, as specified in the control message. The program then loops through decision blocks 75 and 77 (the latter which will be described later) until at decision block 75 an end of the video program 51 is reached and the receiver program 39 terminates.

Subsequent Concurrent Client Requests

Referring now to FIGS. 5, 6, 7 and 8a, at time 0.1, a second request for the same video program 51 may be generated by a second receiver 30' per process block 60 of the receiver program 39 contained in that receiver 30'. Referring to FIG. 6 at process block 62, this second request is received by the server 48. Because, a previous request for the same program is being concurrently processed at process block 64, and may be caught, the second request is placed in hierarchy 100 of FIG. 8a with the first request. The method of grouping the two requests in the hierarchy 100 by process block 64 will be described below in greater detail but in this example, the second request from receiver 30' is placed in a second level dependant on the first request from receiver 30. This indicates that the data streams serving these two requests will merge if there are no subsequent changes to the hierarchy, and that the receiver 30' must begin to receive and store data that is being delivered in the data stream 80 for the receiver 30. For example, but not necessarily, this may be done by the receiver 30'listening in on data stream 80. Alternatively, the server may start a new data stream that delivers this data (possibly at a different rate), which receiver 30' listens to. A third possibility is that the new data stream 82 that the server creates to deliver the program data being concurrently played back by receiver 30', is at higher than the playback rate, and in effect directly realizes the composite data stream 84 shown in FIG. 4. Subsequently in this detailed invention description, we assume that the first of the above three options is followed, but we do not preclude the other two options or variants thereof.

At decision block 65, no change was made to the merge target, hence the position of the first request in the hierarchy 100 so the program proceeds to process block 66 and a control message is sent to receiver 30' (received as indicated by process block 67 of FIG. 7) specifying the streams 80 and 82 that receiver 30' should listen to.

Referring also to FIG. 7, the receiver responds 30' to this control message by listening to the data streams 80 and 82 and recording some part of them per process block 69. This recording can be, for example, at a rate from 5% to 100%.

Per FIG. 6, the data stream 82 responsive to the second request is then initiated at process block 68 and it is received and played by the receiver 30' per process blocks 69 and 74 of FIG. 7. Process blocks 69 and 74 are shown separately for clarity but it will be understood that typically these processes will be executed simultaneously.

Figure 4:
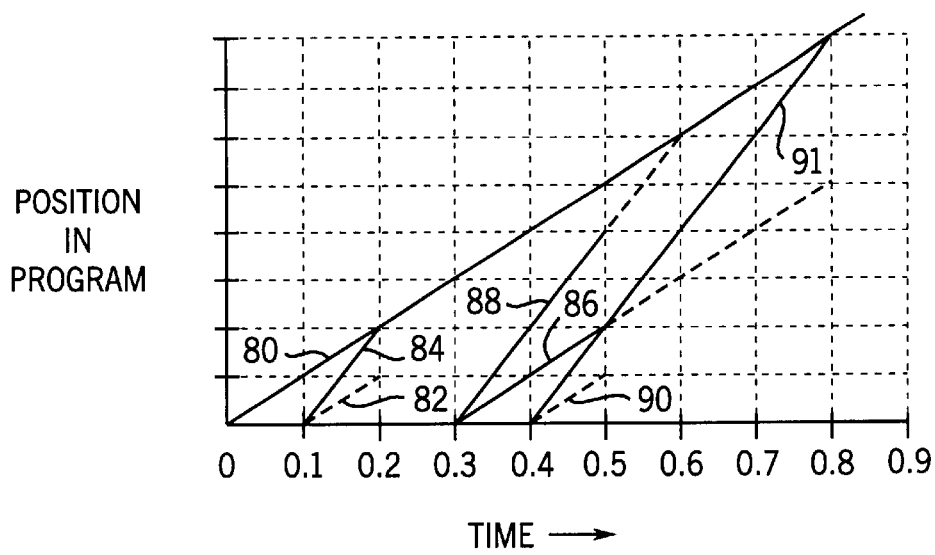
FIG. 4 is a figure similar to FIG. 5 showing the same three client requests processed in a hierarchical manner according to the present invention providing a bandwidth reduction.

As shown in FIG. 4, the second receiver 30' receives a composite data stream 84 made up of recorded data from the data stream 80 and the data stream 82 and the streams will merge at time 0.2. Although as depicted, the client receiver 30 is capable of receiving data at twice the rate of playback (this being the combined rate of the streams 80 and 82), the present invention is equally applicable to situations in which characteristics of the client receiver 30 or the intervening media 41 limit reception to rates less than twice the rate of playback, as long as it is possible to receive at some rate exceeding the playback rate. In general, the ability to receive data at far less than twice the playback rate can be acceptable, resulting simply in longer delays between the merging of streams, whereas higher receive rates decrease the times required to merge.

At the time of the merger of the data streams 80 and 84, the receiver 30 will switch to playing the recorded data stream 80 per normal patching protocols.

Referring generally to FIGS. 5, 6 and 7 and 8a, at time 0.3 yet a third request for the same video program 51 may be received by the server 48 from a third receiver 30". According to the procedures described above, this third request will be integrated in the hierarchy 100 of FIG. 8a according to the dynamic methods of process block 64 as will be described below. Because the dynamic method of forming the hierarchy 100 initially determines whether merger of data streams of two requests is possible, in this case, a data stream responsive to the request at time 0.3 cannot merge with the data stream 82 response to the request at time 0.1 so only one hierarchy 100 is possible, that in which the third request depends hierarchically on the first request at the same level as the second request.

Thus at process block 68 of the server program 53 of the server 48, a third data stream 86 responsive to the request at time 0.3 is generated and the receiver 30" receives a control message indicating that it should begin recording data stream 80 related to the request on which it hierarchically depends. At this time, the hierarchy 100 anticipates that composite data stream 88 (being formed of recorded data from data stream 80 and the third data stream 86) will merge with data stream 80 at time 0.6.

Figure 5:
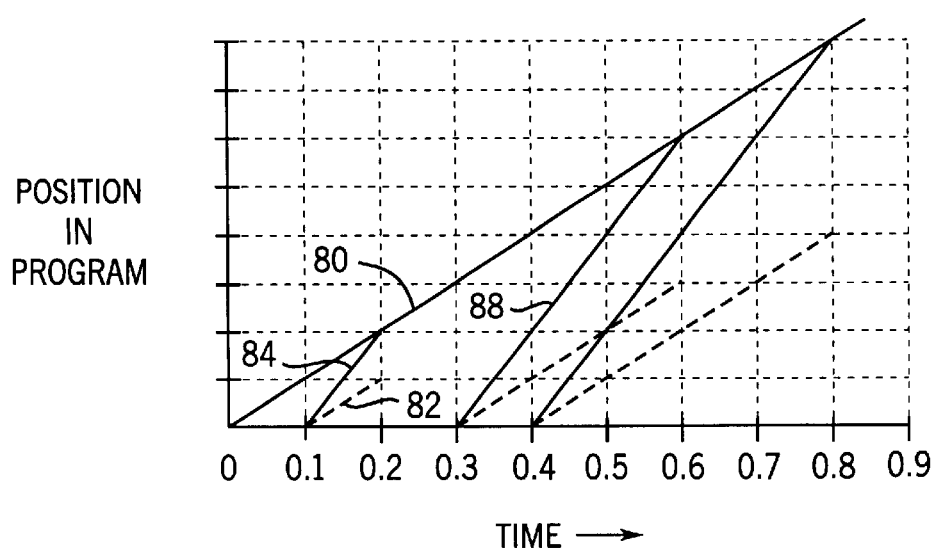
FIG. 5 is a figure similar to that of FIG. 2 showing the use of prior art patching or streaming in a non-hierarchical manner for three client requests at different times.

Referring still to FIGS. 5, 6 and 7, at time 0.4 yet a fourth request for the same video program 51 may be received by the server 48 from a fourth receiver 30'". Again according to the procedures described above, this fourth request will be integrated in the hierarchy 100 according to the dynamic methods as will be described below. In this case, the fourth request of receiver 30''' is made dependant on the third request of client by creating a second level in the hierarchy 100. Hierarchies having nodes separated by at least one node from the root node will henceforth be termed multi-level hierarchies.

At process block 68 of the server program 53 of the server 48, a fourth data stream 90 responsive to the request at time 0.4 is generated and the receiver 30''' receives a control message indicating that it should begin recording data stream 86 related to the third request on which it now hierarchically depends.

Figure 8B:
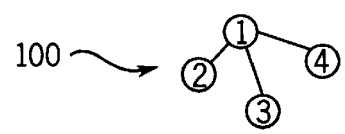

Second levels of the hierarchy 100 are unstable to the extent that they lead to a merger reducing the hierarchy 100 again to single levels. This future merger and change in the hierarchy 100 is handled by queuing the merger's times to trigger a change in the hierarchy 100 appropriately. Thus the message provided by process block 67 establishing the dependency of the fourth request on the third request puts in a time queue yet another change in hierarchy message to be effected at time 0.5 causing a reconnection of both the third request and the fourth request to the first request so that a composite data stream 91 formed of newly recorded data of data stream 80 (beginning at time 0.5) and data stream 86 merges with data stream 80 at time 0.8. This effectively collapses out the second level of the hierarchy 100 after time 0.5 as depicted in FIG. 8b where requests 2, 3, and 4 now depend directly on request 1.

This change of hierarchy 100 is communicated to receiver 30'' associated with the second request so as to indicate a new stream to be received. The change is detected at decision block 77 of the receiver program 39 (shown in FIG. 7). At process block 79, the third receiver 30'' receives the new stream, and may choose to discard all of the data it previously recorded from stream 80, without this creating a need for additional transmissions from the server.

By inspection of FIG. 4, it can be seen that the total bandwidth needed to satisfy the four requests is 1.7 times the bandwidth for one request alone as a result of the merging process. Contrast this with a single level merge hierarchy of conventional patching depicted in FIG. 5, which requires 1.8 times the bandwidth of one request. This improvement in bandwidth utilization is more pronounced with large numbers of requests.

Methods of Establishing Merge Targets

Referring again to FIG. 6, process blocks 64 and 65, one approach to selecting merge targets is to model the bandwidth and other costs ("total economic costs') associated with each physically achievable combination of merges of current streams and anticipated client arrivals.

Another approach for selecting merge targets is to use one of the methods previously defined for the prior art of piggybacking. For example, referring to FIG. 9a, the static tree method defined for piggybacking would cause client B to merge with A and client D to merge with C, prior to clients C and D merging with A and B, based on client arrival order. The new invention implements the merges defined in the static tree method, or in any other method defined for piggybacking, without requiring the time distortion in the streams that occurs in piggybacking, which also enables the merges to happen more quickly.

Figure 9A:
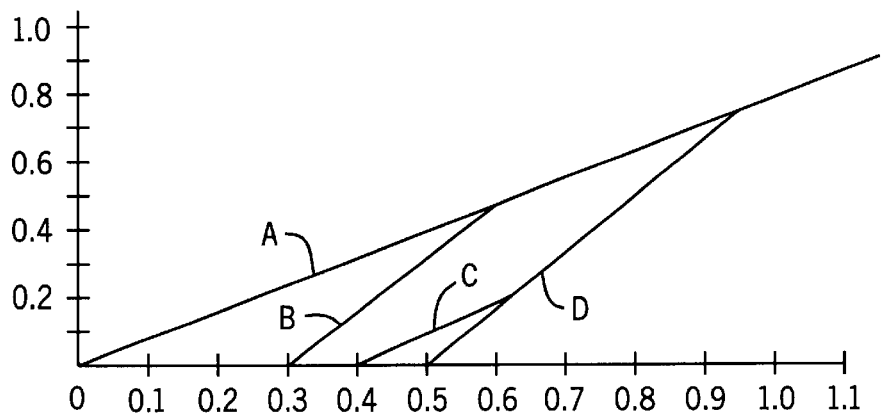
FIGS. 9a-c are figures similar to that of FIG. 4 used in explaining some simple hierarchy forming rules.

A third approach creates new methods for still more efficient merging by taking advantage of the fact that clients receive and store extra data to implement a merge. In particular, one stream can have a merge target, and simultaneously the merge target can have another merge target. Referring to FIG. 9a, when client C arrives, the stream for client B can be a merge target for client C while the stream for client A is a merge target for client B. It is useful to have both merges in progress simultaneously because which of the two merges should be performed first depends on future client request arrival times that are not known when the stream for client C is initiated. This approach of allowing a stream that has a merge target to simultaneously serve as a merge target for another stream is not possible in prior stream merging techniques. As described below, there are several possible simple rules that can be applied at each stream initiation and stream merge time to dynamically select the simultaneously occurring merge targets, each rule differing in the amount of effort put in to evaluating the best possible merge target. The notion of a "race", defined earlier, causes the merges to occur in time order.

1. Early Merging

Early merging supports the intuitive hypothesis that in choosing merge targets, one should merge the two neighboring streams that can be merged at the earliest point in time, followed by the next such pair and so on. For example in FIG. 9b, stream C can be merged with B sooner than B can be merged with A.

2. Earliest Reachable Merge Target (ERMT)

Figure 9B:
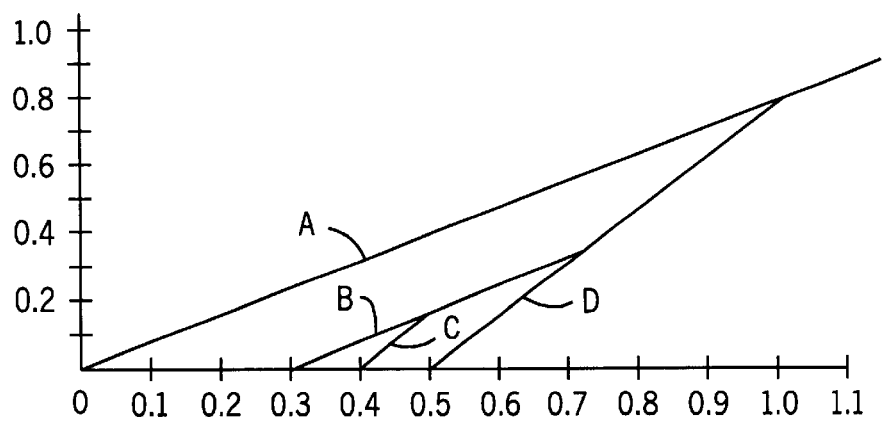

In this variant of early merging, a new client or newly merged group of clients records the closest stream that it can merge with, if no later arrivals preemptively catch them. For example, for the client in FIG. 9b, client B will listen to the stream for client A, client C will listen to the stream for client B, and client D will also listen to the stream that was initiated for client B. D listens to B's stream because D cannot merge with C (since C will merge with B at time 0.5). D can catch the merged stream for B and C, and this is the earliest reachable merge target for D if no later arrivals preemptively merge with D as shown in FIG. 9b.

One way to compute the target stream to record is to "simulate" the future evolution of the system, given the current merge target for each active stream and the rule for determining new merge targets, and assuming no future client arrivals. A more efficient, incremental maintenance of the merge tree is also possible. One approach involves keeping a list $L_S$ for each active stream S of all earlier streams that were active at the time S was initiated, together with the ending times of these streams as had been predicted prior to the arrival of S. The current scheduled ending times of all active streams are also maintained, in a list $L_{current}$. When a new request occurs, the list $L_S$ for the new stream S that is created for this request is set equal to $L_{current}$. Further, $L_{current}$ is used to compute the merge target stream T for the new client, and thus as well the projected length of the new stream S. T's own list $L_T$ (together with the projected time at which stream S will merge with stream T, after which T will be able to make progress towards merging with some earlier stream) is then used to compute an updated merge target for T, and an updated length. This (possibly new) merge target for T is now, in turn, considered, in the same fashion as was stream T. This process continues until a stream is reached that cannot catch any earlier stream, at which point the scheduled ending times of the active streams have been correctly updated, as necessary, and an updated list $L_{current}$ has been formed.

3. Simple Reachable Merge Target (SRMT)

The requirement of ERMT that all merge targets be the earliest possible complicates the calculation of which target stream to record. A simpler approach is to determine the closest reachable merge target if each currently active stream terminates at its current target merge point (or at the end of the file if it has no current target merge point). For example, if client D arrives at time 0.49 in FIG. 9c, D will snoop on stream for client A, since D cannot reach client B's stream before its target merge point at time 0.6 leading to the structure shown in FIG. 9c.

The SRMT is easily computed. For M currently active streams numbered 1 . . . M in order of earliest client arrival time, let $D_{j,i}, 1 \leq j < i \leq M$, be the distance between streams j and i (i.e., the time, from the current time, that it would take to accomplish a merge of streams i and j). Let T (j) be the known target stream for each stream j<i. Stream i is assigned merge target k for which $D_{k,i} < D_{T(k),k}$ and k is as large as possible, k<i.

SRMT overlooks some merges that ERMT finds. (For example, if client D arrives at time 0.49 under ERMT, client D will snoop on client B's stream.) This happens because SRMT ignores the fact that a new merged stream is created when two streams merge. This simplifies the calculation of the stream to listen in on, but results in some merge operations taking longer than necessary.

4. Closest Target (CT)

Figure 9C:
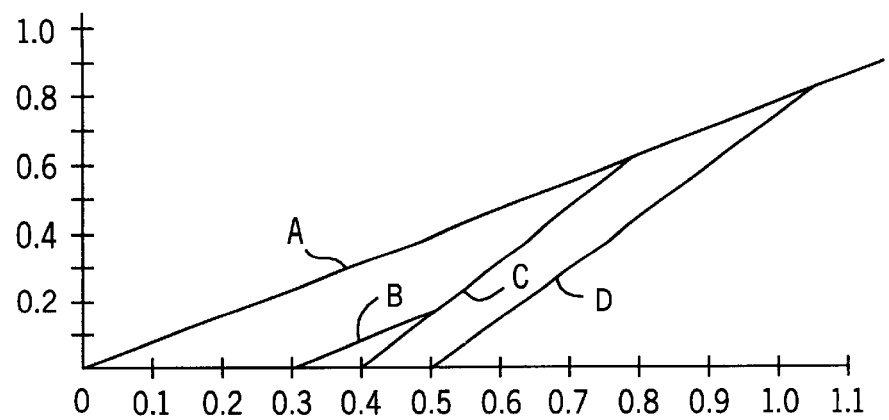

This scheme simply chooses the closest earlier stream still in the system as the next merge target. In FIG. 9c, if client D arrives at time 0.49, D would simply listen in on the stream initiated for C.

The merge targets computed by CT are not necessarily reachable, even if no further arrivals occur. The reason is that the target stream may itself merge with its target before the later stream can reach it. When this happens, the later stream must select a new merge target, again using the CT algorithm.

The above description has been that of a preferred embodiment of the present invention, it will occur to those that practice the art that many modifications may be made without departing from the spirit and scope of the invention. For example, the transmissions refereed to above may be divided into fractional bandwidth signals each of which carries less than the full bandwidth required to convey a program of streaming data in real-time, (but which together provide the full data of the program in real-time) and the merging principles discussed above may be applied to these fractional bandwidth signals. In order to apprise the public of the various embodiments that may fall within the scope of the invention, the following claims are made.

We claim:

1. A method of transmitting streaming data, comprising the steps of:
   (a) starting an original transmission of a program;
   (b) after step (a), scheduling a requested transmission of the program in response to a client request;
   (c) selecting a target transmission that is farther along in the program than the requested transmission as a merge target for the requested transmission;
   (d) receiving at the client a composite of the requested transmission and data of the target transmission; and
   (e) after step (d), merging the requested transmission and target transmission to provide a merged transmission; and
   (f) after step (e), merging the merged transmission with the original transmission.

2. The method of claim 1 wherein the merge target simultaneously has a third transmission that is still farther along in the program as its merge target.

3. The method of claim 1 wherein the beginning of each transmission is asynchronous in response to an asynchronous request by a client.

4. The method of claim 1 wherein the beginning of each transmission is aperiodic in response to aperiodic requests by clients.

5. The method of claim 1 wherein the merge target is chosen to reduce transmission costs that are a function of total bandwidth of the transmission of the streaming data to clients.

6. The method of claim 5 wherein the transmission costs equal total economic cost of the transmission of the streaming data to clients.

7. The method of claim 5 wherein the determination of transmission costs is done by modeling transmission costs for different possible combinations of mergers of the transmissions.

8. The method of claim 5 wherein the determination of transmission costs is done according to predetermined rules anticipating transmission costs.

9. The method of claim 1 wherein each transmission is terminated at the earliest time that it has merged with the merge target.

10. The method of claim 1 wherein step (c) of selecting a merge target selects a target transmission that results in the earliest achievable merger for that client, given that no later clients merge with that client.

11. The method of claim 1 wherein step (c) of selecting a merge target selects a target transmission that is the least ahead of the transmission.

12. The method of claim 1 wherein the merging of the transmission and the target transmission in step (e) includes the steps of:
   (i) the client recording the data of the target transmission, beginning when the merge target is selected;
   (ii) ceasing the transmission of the requested transmission when the requested transmission reaches a first point in the program that was recorded at step (i).

13. The method of claim 12 wherein the transmission is at the program playback rate and wherein the recording rate is at least equal to the playback rate.

14. The method of claim 12 wherein the transmission is at the program playback rate and wherein the recording rate is at less than the playback rate.

15. The method of claim 14 wherein the recording rate is between 5% and 100% of the playback rate.

16. A method of transmitting a streaming data on-demand comprising the steps of:
   (a) receiving at different times to requests for transmission of the streaming data from clients i;
   (b) beginning i transmissions of the streaming data to the i clients;
   (c) grouping the i transmissions into merge hierarchies defining merger of the transmissions of the streaming data to reduce the total transmission cost;
   (d) receiving at a time $t_{i+1}$ subsequent to the times $t_i$ a request for transmission of the streaming data from client i+1; and
   (e) changing the grouping of the merge hierarchies in response to the receipt of the request from client i+1.

17. The method of claim 16 wherein the beginnings of the i transmissions are asynchronous with respect to each other.

18. The method of claim 16 wherein the transmission costs equal total bandwidth of the transmission of the streaming data to clients.

19. The method of claim 16 wherein the transmission costs equal total economic cost of the transmission of the streaming data to clients.

20. A method of transmitting streaming data, on-demand, comprising the steps of:
- (a) scheduling a requested transmission stream in response to a request of a client;
- (b) selecting an earlier transmission stream as a merge target for the requested transmission stream so that the client receives both the requested transmission stream and the earlier transmission stream and so that the requested transmission stream could merge at a merger time with the earlier transmission stream; and
- (c) subsequent to step (b), and prior to the merge time, changing the merge time.

21. The method of claim 1, wherein step (d) further comprises concurrently receiving the requested transmission and the target transmission at the client.

22. A method as recited in claim 1, wherein the composite of requested stream is transmitted as a single stream.

23. The method of claim 1, wherein the requested transmission is not time distorted.

24. The method of claim 1, wherein the target transmission is not time distorted.

25. The method of claim 16, wherein the transmission of the streaming data is not time distorted.

26. The method of claim 20, wherein the requested transmission stream is not time distorted.

27. The method of claim 20, wherein the earlier transmission stream is not time distorted.

* * * * *

UNITED STATES PATENT AND TRADEMARK OFFICE
CERTIFICATE OF CORRECTION

PATENT NO. : 6,859,839 B1
DATED : February 22, 2005
INVENTOR(S) : John Zahorjan et al.

It is certified that error appears in the above-identified patent and that said Letters Patent is hereby corrected as shown below:

Column 12,
Line 48, "times to request" should be -- times $t_i$ request --

Column 13,
Line 9, "merger" should be -- merge --

Signed and Sealed this

Third Day of May, 2005

JON W. DUDAS
*Director of the United States Patent and Trademark Office*